United States Patent
Uekama et al.

(10) Patent No.: US 8,879,910 B2
(45) Date of Patent: *Nov. 4, 2014

(54) OPTICAL PACKET SWITCHING SYSTEM AND OPTICAL PACKET TRANSMITTER DEVICE

(75) Inventors: Kimio Uekama, Kawasaki (JP); Shota Mori, Kawasaki (JP)

(73) Assignee: Fujitsu Telecom Networks Limited, Kanagawa (JP)

(*) Notice: Subject to any disclaimer, the term of this patent is extended or adjusted under 35 U.S.C. 154(b) by 76 days.

This patent is subject to a terminal disclaimer.

(21) Appl. No.: 13/368,109

(22) Filed: Feb. 7, 2012

(65) Prior Publication Data

US 2012/0201538 A1 Aug. 9, 2012

(30) Foreign Application Priority Data

Feb. 9, 2011 (JP) ................................. 2011-026145

(51) Int. Cl.
*H04J 14/00* (2006.01)
*H04L 12/721* (2013.01)
*H04Q 11/00* (2006.01)

(52) U.S. Cl.
CPC ............ *H04Q 11/0005* (2013.01); *H04L 45/62* (2013.01); *H04Q 2011/0016* (2013.01); *H04Q 2011/0039* (2013.01); *H04Q 11/0066* (2013.01)
USPC ..................... 398/45; 398/46; 398/47; 398/54

(58) Field of Classification Search
USPC ............................... 398/54, 47, 45
See application file for complete search history.

(56) References Cited

U.S. PATENT DOCUMENTS

| | | | | |
|---|---|---|---|---|
| 5,953,143 A | * | 9/1999 | Sharony et al. | 398/46 |
| 6,525,851 B2 | * | 2/2003 | Chang et al. | 398/166 |
| 6,665,495 B1 | * | 12/2003 | Aicklen et al. | 398/54 |
| 6,721,315 B1 | * | 4/2004 | Xiong et al. | 370/389 |

(Continued)

FOREIGN PATENT DOCUMENTS

| | | |
|---|---|---|
| JP | 01-226244 A | 9/1989 |
| JP | 03-013034 A | 1/1991 |
| JP | 2008-235986 | 10/2008 |

OTHER PUBLICATIONS

Notification of Reason(s) for Refusal for Japanese patent application No. 2011-025242 dispatched by the Japanese Patent Office on Dec. 10, 2013, with English translation, 4 pages.

*Primary Examiner* — Ken Vanderpuye
*Assistant Examiner* — Amritbir Sandhu
(74) *Attorney, Agent, or Firm* — Christie, Parker & Hale, LLP

(57) ABSTRACT

An optical packet transmitter device includes: a detection unit for detecting packet-length information and priority information from a received Ether signal; a setting unit for setting, according to the degree of priority, a division factor by which the Ether signal is divided and a wavelength used for an optical packet signal to be transmitted; a header generation unit for generating a header containing destination information, the packet-length information, the priority information, and information of wavelength in use of the Ether signal; a transmission processing unit for dividing the Ether signal according to the set division factor and generating a plurality of packet signals; a header insertion unit for inserting the generated header in at least one packet signal; and an electrical/optical converter unit for converting the plurality of packet signals into optical packet signals of a plurality of wavelengths according to the set wavelength in use.

11 Claims, 15 Drawing Sheets

(56) References Cited

U.S. PATENT DOCUMENTS

| | | | |
|---|---|---|---|
| 6,760,549 B2* | 7/2004 | Chang et al. | 398/51 |
| 6,766,114 B2* | 7/2004 | Chang et al. | 398/51 |
| 6,925,257 B2* | 8/2005 | Yoo | 398/47 |
| 6,957,018 B2* | 10/2005 | Araki et al. | 398/51 |
| 7,120,357 B2* | 10/2006 | Doukai | 398/43 |
| 7,764,881 B2* | 7/2010 | Aoki | 398/2 |
| 8,150,264 B2* | 4/2012 | Tang et al. | 398/82 |
| 8,229,300 B2* | 7/2012 | Bogoni et al. | 398/45 |
| 2001/0017723 A1* | 8/2001 | Chang et al. | 359/128 |
| 2002/0109882 A1* | 8/2002 | Araki et al. | 359/139 |
| 2002/0131120 A1* | 9/2002 | Araki et al. | 359/139 |
| 2002/0141019 A1* | 10/2002 | Chang et al. | 359/139 |
| 2002/0145785 A1* | 10/2002 | Chang et al. | 359/135 |
| 2003/0048506 A1* | 3/2003 | Handelman | 359/128 |
| 2003/0138253 A1* | 7/2003 | Kim et al. | 398/69 |
| 2003/0179783 A1* | 9/2003 | Uekama et al. | 370/535 |
| 2004/0213229 A1* | 10/2004 | Chang et al. | 370/390 |
| 2005/0180750 A1* | 8/2005 | Wada et al. | 398/49 |
| 2005/0185958 A1* | 8/2005 | Atsumi et al. | 398/49 |
| 2006/0171386 A1* | 8/2006 | Hesse et al. | 370/389 |
| 2007/0196107 A1* | 8/2007 | Takita | 398/45 |
| 2008/0056715 A1* | 3/2008 | Akiyama et al. | 398/45 |
| 2009/0003827 A1* | 1/2009 | Kai et al. | 398/45 |
| 2009/0034970 A1* | 2/2009 | Bogoni et al. | 398/45 |
| 2009/0129775 A1* | 5/2009 | Handelman | 398/47 |
| 2010/0329674 A1* | 12/2010 | Bader | 398/45 |
| 2011/0081149 A1* | 4/2011 | Wada et al. | 398/54 |
| 2012/0063777 A1* | 3/2012 | Tanaka et al. | 398/47 |
| 2012/0128352 A1* | 5/2012 | Kawasaki et al. | 398/45 |
| 2012/0148239 A1* | 6/2012 | Mori et al. | 398/45 |
| 2012/0155869 A1* | 6/2012 | Sato | 398/45 |
| 2012/0163815 A1* | 6/2012 | Mori et al. | 398/51 |
| 2012/0201537 A1* | 8/2012 | Uekama et al. | 398/51 |
| 2012/0201538 A1* | 8/2012 | Uekama et al. | 398/51 |
| 2012/0201540 A1* | 8/2012 | Uekama et al. | 398/54 |
| 2012/0219291 A1* | 8/2012 | Chiku et al. | 398/46 |
| 2012/0243868 A1* | 9/2012 | Meyer et al. | 398/46 |
| 2012/0251109 A1* | 10/2012 | Mori | 398/51 |
| 2013/0279907 A1* | 10/2013 | Zhang et al. | 398/45 |

\* cited by examiner

| 1 | 1 | 1 | 1 | 1 | ~ | 1 | 0 | 0 | 0 | 0 | 0 | 0 | 0 |

WAVELENGTH IN USE:1
WAVELENGTH NOT IN USE:0

FIG.14

| 1 | 0 | 1 |

GROUP 1:000 GROUP 3:010 GROUP 5:100 GROUP 7:110
GROUP 2:001 GROUP 4:011 GROUP 6:101 GROUP 8:111

FIG.15

EXAMPLE TABLE OF GROUP-WAVELENGTH COMPOSITION

| bit | GROUP NAME | WAVELENGTH | bit | GROUP NAME | WAVELENGTH |
|---|---|---|---|---|---|
| 000 | GROUP 1 | $\lambda 1 \sim \lambda 10$ | 100 | GROUP 5 | $\lambda 21 \sim \lambda 40$ |
| 001 | GROUP 2 | $\lambda 11 \sim \lambda 20$ | 101 | GROUP 6 | $\lambda 1 \sim \lambda 10, \lambda 21 \sim \lambda 40$ |
| 010 | GROUP 3 | $\lambda 21 \sim \lambda 30$ | 110 | GROUP 7 | $\lambda 1 \sim \lambda 20, \lambda 31 \sim \lambda 40$ |
| 011 | GROUP 4 | $\lambda 31 \sim \lambda 40$ | 111 | GROUP 8 | $\lambda 1 \sim \lambda 30$ |

OPTICAL PACKET SWITCHING SYSTEM AND OPTICAL PACKET TRANSMITTER DEVICE

CROSS-REFERENCE TO RELATED APPLICATION

This application claims priority to and the benefit of Japanese Patent Application Number 2011-026145, filed on Feb. 9, 2011, the entire disclosure of which is incorporated herein by reference.

BACKGROUND OF THE INVENTION

1. Field of the Invention

The present invention relates to an optical packet switching method in which packet-by-packet optical packet switching is enabled by driving an optical switch according to destination information assigned to an optical packet signal.

2. Description of the Related Art

The technology of switching the path depending on the wavelength in an optical transmission system based on wavelength division multiplexing (WDM) and by employing a wavelength selective switch (WSS) is in practical use. One of the next-generation technologies studied is an optical packet switching system in which the path is switched in smaller units, namely, IP packets (10 Gigabit Ethernet (registered trademark) signals, etc.). Each packet is converted in format into an optical packet and routed by using an ultrahigh-speed optical switch (see e.g., patent document No. 1).

When the transmission is based on IP packets, no significant information is transmitted absent any data so that the bandwidth is wasted accordingly. If the optical packet switching system is realized, however, any idle time in which data is absent can be occupied by another packet. Therefore, the optical packet switching system promises the possibility of dramatically increasing the bandwidth usage efficiency of the transmission path and is envisaged as a technology of the future.

[Patent document No. 1] JP 2008-235986

Meanwhile, the degree of priority for transmission may be set for a client signal such as, e.g., an Ether signal according to the type (emails, phones, video images, etc.) of data. In such a situation, an optical packet signal with a high degree of priority is preferably transmitted at speed higher than an optical packet signal with a low degree of priority.

SUMMARY OF THE INVENTION

The present invention addresses the background as described above, and a purpose thereof is to provide a technology capable of transmitting a client signal with a high degree of priority at high speed in an optical packet switching system.

An optical packet switching system according to one embodiment of the present invention comprises: an optical packet transmitter device including a detection unit configured to detect packet-length information and priority information from a received client signal, a setting unit configured to set, according to the degree of priority, a division factor by which the client signal is divided and a wavelength used for an optical packet signal to be transmitted, a header generation unit configured to generate a header containing destination information, the packet-length information, the priority information, and information of wavelength in use of the client signal, a transmission processing unit configured to divide the client signal according to the set division factor and generate a plurality of packet signals, a header insertion unit configured to insert the generated header in at least one packet signal, and an electrical/optical converter unit configured to convert the plurality of packet signals into optical packet signals of a plurality of wavelengths according to the set wavelength in use; and an optical packet switching device including a plurality of receiver units configured to receive wavelength-multiplexed optical packet signal in which the optical packet signals of a plurality of wavelengths are multiplexed, a branching unit configured to branch the received wavelength-multiplexed optical packet signals into optical packet signals of wavelengths with the header, an optical switch unit configured to route the wavelength-multiplexed optical packet signals, an analyzer unit configured to analyze the header of the branched optical packet signals so as to detect the destination information, the priority information, and the information of the wavelength in use, and an output competition determination unit configured to check for temporal competition of the plurality of wavelength-multiplexed optical packet signals input to the plurality of receiver units based on destination information, to check for competition regarding wavelengths of the plurality of wavelength-multiplexed optical packet signals input to the plurality of receiver units based on the information of wavelength in use, and to determine whether the optical packet signals should be transmitted or discarded based on the priority information when there is competition regarding time and wavelengths.

The setting unit may set the division factor by which the client signal is divided and the corresponding number of wavelengths in use to be a first predetermined value and set the wavelengths in use to be a predetermined first wavelength group when the degree of priority is less than a reference level. The setting unit may set the division factor and the number of wavelengths in use to be a second predetermined value, which is larger than the first predetermined value, and set the wavelengths in use to a predetermined second wavelength group when the degree of priority is at least the predetermined reference level.

The first wavelength group and the second wavelength group may have different wavelength allocation.

The optical packet switching system may comprise a plurality of the optical packet transmitter devices as nodes, and the wavelength allocation of the first wavelength group may be different on a node-by-node basis.

The output competition determination unit may compare the degree of priority of competing wavelength-multiplexed optical packet signals when there is competition regarding time and wavelengths in the plurality of wavelength-multiplexed optical packet signals, and the output competition determination unit may allow a wavelength-multiplexed optical packet signal input first to pass and discard the following wavelength-multiplexed optical packet signal when the wavelength-multiplexed optical packet signals have equal degree of priority.

The output competition determination unit may compare the degree of priority of competing optical packet signals when there is competition regarding time and wavelengths in the plurality of wavelength-multiplexed optical packet signals, and the output competition determination unit may allow an optical packet signal having a high degree of priority to pass and discard an optical packet having a low degree of priority when the optical packet signals have different degree of priority.

The optical packet transmitter device may further comprise a table associating the degree of priority and a wavelength group.

Yet another embodiment of the present invention relates to an optical packet transmitter device. The device for use in an optical packet switching system comprises: a detection unit configured to detect packet-length information and priority information from a received client signal; a setting unit configured to set, according to the degree of priority, a division factor by which the client signal is divided and a wavelength used for an optical packet signal to be transmitted; a header generation unit configured to generate a header containing destination information, the packet-length information, the priority information, and information of wavelength in use of the client signal; a transmission processing unit configured to divide the client signal according to the set division factor and generate a plurality of packet signals; a header insertion unit configured to insert the generated header in at least one packet signal; and an electrical/optical converter unit configured to convert the plurality of packet signals into optical packet signals of a plurality of wavelengths according to the set wavelength in use.

Optional combinations of the aforementioned constituent elements, or implementations of the invention in the form of apparatuses, methods, systems, programs, and recording mediums storing programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 13 shows an example of a bit configuration for transmitting information of wavelength in use;

FIG. 14 shows another example of the bit configuration for transmitting the information of wavelength in use; and FIG. 15 shows an example of a table associating a wavelength group with wavelength composition.

DETAILED DESCRIPTION OF THE INVENTION

The invention will now be described by reference to the preferred embodiments. This does not intend to limit the scope of the present invention, but to exemplify the invention.

A description will now be given of the optical packet switching system according to an embodiment of the present invention. Prior to an explanation of the optical packet switching system according to the embodiment of the present invention, an explanation is given as a comparative example regarding an optical packet switching system conventionally developed by the present inventors.

Figure 1:
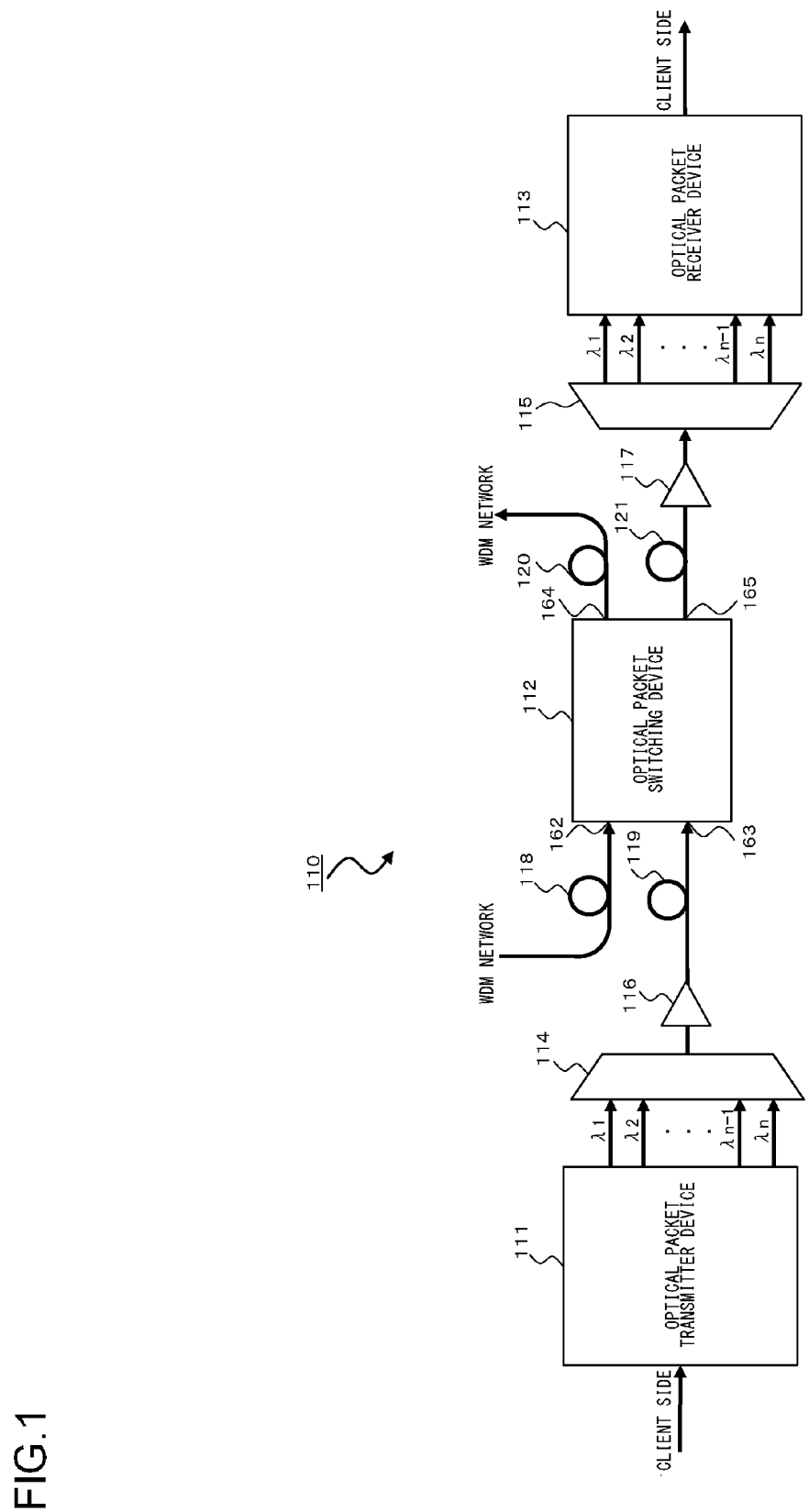
FIG. 1 shows an optical packet switching system according to a comparative example.

FIG. 1 shows an optical packet switching system 110 according to the comparative example. As shown in FIG. 1, the optical packet switching system 110 comprises an optical packet transmitter device 111, an optical packet switching device 112, an optical packet receiver device 113, a first AWG 114, a second AWG 115, a first optical amplifier 116, a second optical amplifier 117, and first through fourth optical transmission paths 118-121.

The optical packet transmitter device 111 generates a routing information header (including a packet length, destination information, and a local node ID) that indicates a forwarding destination of a 10 Gigabit Ethernet packet received from a client, adds the routing information header to the head of the packet, and then divides the data of the packet by n. The optical packet transmitter device 111 then adds the divided n pieces of data to optical signals at wavelengths $\lambda 1$-$\lambda n$ and outputs the optical signals as optical packet signals of n wavelengths. Regardless of the packet length of an Ether signal, the number by which an Ether packet is divided is fixed to n (the maximum number of wavelengths that can be used in a system, e.g., n=40).

The optical packet signals of n wavelengths (at wavelengths $\lambda 1$-$\lambda n$) output from the optical packet transmitter device 111 are multiplexed by the first AWG 114, then amplified by the first optical amplifier 116, and output to the second optical transmission path 119.

The optical packet signal propagated through the second optical transmission path 119 is input to a second input unit 163 of the optical packet switching device 112. To a first input unit 162 of the optical packet switching device 112, a wavelength-multiplexed optical packet signal from another optical packet transmitter device connected to a WDM network is input via the first optical transmission path 118.

The optical packet switching device 112 is a 2-input×2-output optical packet switching device that switches a route of an optical packet signal in accordance with destination information assigned to the optical packet signal. The third optical transmission path 120 is connected to the first output unit 164 of the optical packet switching device 112, and the fourth optical transmission path 121 is connected to the second output unit 165. The optical packet signal propagated through the third optical transmission path 120 is output to the WDM network. Meanwhile, the optical packet signal propagated through the fourth optical transmission path 121 is amplified by the second optical amplifier 117 and then demultiplexed into wavelengths of $\lambda 1$-$\lambda n$ by the second AWG 115. The optical packet signals of n wavelengths demultiplexed by the second AWG 115 are input to the optical packet receiver device 113.

The optical packet receiver device 113 restores the received optical packet signals of n wavelengths to the original Ether packet and outputs the restored Ether packet to the client.

Figure 2:
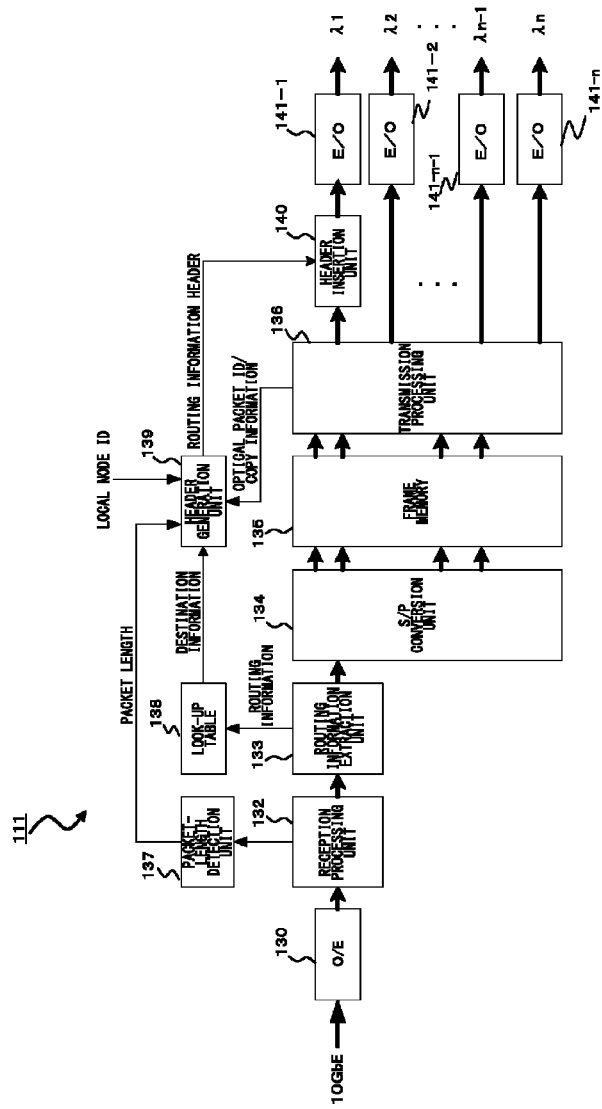
FIG. 2 shows the configuration of an optical packet transmitter device according to the comparative example.

FIG. 2 shows the configuration of the optical packet transmitter device 111 according to the comparative example. As shown in FIG. 2, the optical packet transmitter device 111 comprises an optical/electrical converter unit 130, a reception processing unit 132, a routing information extraction unit 133, a serial/parallel conversion unit 134, a frame memory 135, a transmission processing unit 136, a packet-length detection unit 137, a look-up table 138, a header generation unit 139, a header insertion unit 140, and first through nth electrical/optical converter units 141-1 through 141-*n*.

In the optical packet transmitter device 111, a 10 Gigabit Ethernet signal input from the client is converted into an electrical signal by the optical/electrical converter unit 130. The data format of this electrical Ether signal is a MAC frame. A predetermined reception process is then performed on the Ether signal in the reception processing unit 132. The routing information extraction unit 133 then extracts routing information from the Ether signal. The routing information is converted into destination information by referring to the look-up table 138 and then input to the header generation unit 139. The packet-length detection unit 137 extracts the packet length of the received Ether signal and then outputs the extracted packet length to the header generation unit 139.

The Ether signal output from the routing information extraction unit 133 is converted into a parallel signal by the serial/parallel conversion unit 134 and then stored in the frame memory 135. The Ether signal is then equally divided by n by the transmission processing unit 136 so as to generate n pieces of packet signals. Optical packet ID/copy information is output from the transmission processing unit 136 to the header generation unit 139.

The header generation unit 139 generates a routing information header based on the packet length, the destination information, the local node ID, and the optical packet ID/copy information. The generated routing information header is inserted in one packet signal among the n pieces of packet signals divided by the header insertion unit 140. The n pieces of packet signals are then converted into optical signals by the first through nth electrical/optical converter units 141-1 through 141-*n* and then output as optical packet signals of n wavelengths ($\lambda 1$-$\lambda n$). The wavelength of an optical packet signal in which the routing information header is inserted is referred to as a "header wavelength." The header wavelength is $\lambda 1$ in this case.

Figure 3:
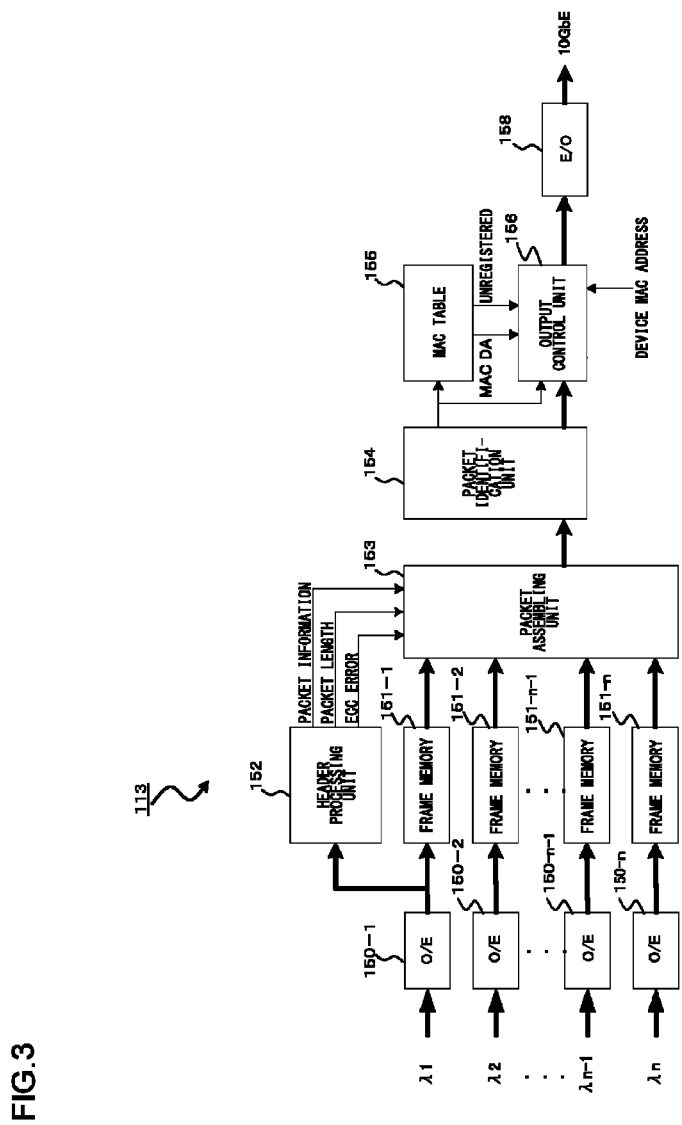
FIG. 3 shows the configuration of an optical packet receiver device according to the comparative example.

FIG. 3 shows the configuration of an optical packet receiver device 113 according to the comparative example. As shown in FIG. 3, the optical packet receiver device 113 comprises a first through nth optical/electrical converter units 150-1 through 150-*n*, first through nth frame memories 151-1 through 151-*n*, a header processing unit 152, a packet assembling unit 153, a packet identification unit 154, a MAC table 155, an output control unit 156, and an electrical/optical converter unit 158.

In the optical packet receiver device 113, the optical packet signals of n wavelengths ($\lambda 1$-$\lambda n$) that have been input are converted into electrical packet signals by the first through nth optical/electrical converter units 150-1 through 150-*n*, respectively. The header processing unit 152 extracts packet information, a packet length, and an ECC (Error Check Code) error from the routing information header of a packet signal that corresponds to the optical packet signal of the header wavelength of $\lambda 1$ so as to determine the normality of the packet signal.

The n pieces of packet signals output from the first through nth optical/electrical converter units 150-1 through 150-*n* are stored in the first through nth frame memories 151-1 through 151-*n*, respectively. The packet assembling unit 153 assembles a packet in reference to the packet information, the packet length, and the ECC error from the header processing unit 152. The packet identification unit 154 identifies an Ether packet from the output of the packet assembling unit 153 and extracts the Ether packet. In reference to the MAC table 155, the output control unit 156 replaces a destination MAC address in the Ether packet output from the packet identification unit 154 with a MAC address registered in the MAC table 155. The Ether packet is then input to the electrical/optical converter unit 158. The data format of the Ether signal input to the electrical/optical converter unit 158 is a MAC frame. The electrical/optical converter unit 158 converts the Ether packet into an optical signal and then output the optical signal to the client.

Figure 4:
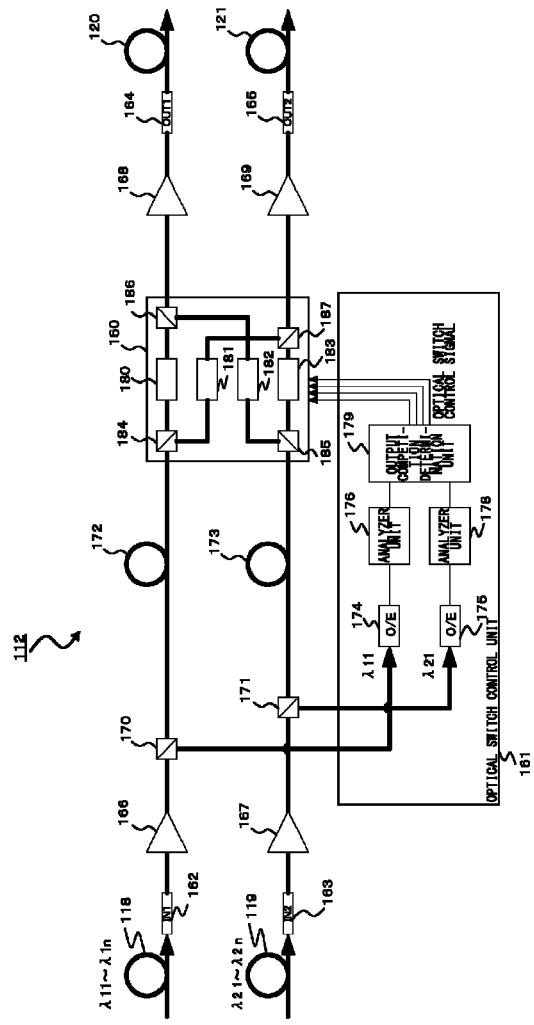
FIG. 4 shows the configuration of an optical packet switching device according to the comparative example.

FIG. 4 shows the configuration of an optical packet switching device 112 according to the comparative example. As shown in FIG. 4, the optical packet switching device 112 comprises an optical switch unit 160, an optical switch control unit 161, a first input unit 162, a second input unit 163, a first input-side optical amplifier 166, a second input-side optical amplifier 167, a first demultiplexer 170, a second demultiplexer 171, a first optical delay line 172, a second optical delay line 173, a first output-side optical amplifier 168, a second output-side optical amplifier 169, a first output unit 164, and a second output unit 165. The optical switch control unit 161 comprises a first optical/electrical converter unit 174, a second optical/electrical converter unit 175, a first analyzer unit 176, a second analyzer unit 178, and an output competition determination unit 179.

The optical packet switching device 112 extracts the routing information header from an optical packet signal that has been input as a WDM signal from the client or the network. The optical packet switching device 112 then determines an output destination based on the routing information header and switches the output destination by the optical switch unit 160.

Wavelength-multiplexed optical packet signals of n wavelengths are input to the first input unit 162 and the second input unit 163. The optical packet signals that are input are obtained by converting an Ether signal from a client unit of the local node or a client unit of another node in an optical packet transmitter device such as the one shown in FIG. 2.

The optical packet signals that have been input are amplified by the first input-side optical amplifier 166 and second input-side optical amplifier 167 for optical level adjustment. Then, only optical packet signals of header wavelengths are optically branched by the first demultiplexer 170 and the second demultiplexer 171. The branched optical packet signals of header wavelengths are input to the optical switch control unit 161. Meanwhile, wavelength-multiplexed optical packet signals are input to the optical switch unit 160 via the first optical delay line 172 and the second optical delay line 173.

The branched optical packet signals of the header wavelengths are converted into electrical packet signals by the first optical/electrical converter unit 174 and the second optical/electrical converter unit 175, respectively. Then, routing information headers thereof are analyzed by the first analyzer unit 176 and the second analyzer unit 178 so as to detect destination information.

The output competition determination unit 179 determines whether the optical packet signals should be transmitted or discarded based on the detected destination information and outputs an optical switch control signal to the optical switch unit 160 based on the result of determination.

The first optical delay line 172 and the second optical delay line 173 delay the wavelength-multiplexed optical packet signals for a duration required for the optical switch control unit 161 to generate the optical switch control signal. By providing the first optical delay line 172 and the second optical delay line 173, on/off of the optical switch unit 160 can be controlled to be synchronized with the timing of arrival of the optical packet signals at the optical switch unit 160.

The optical switch unit 160 is a 2×2 optical switch and comprises first through fourth optical gate switches 180 through 183 and four optical couplers 184-187. The optical gate switches may be implemented by a semiconductor optical amplifier (SOA). The first through fourth optical gate switches 180 through 183 are controlled to be turned on or off by an optical switch control signal from the optical switch control unit 161. In the optical packet switching device 112, the wavelength-multiplexed optical packet signals of n wavelengths are routed all at once based on the destination information extracted from an optical packet signal of one header wavelength.

FIGS. 5A-5C illustrate output competition determination in the optical packet switching device 112. FIG. 5A shows an optical packet signal input to the first input unit 162. FIG. 5B shows an optical packet signal input to the second input unit 163. FIG. 5C shows an optical packet signal output from the first output unit 164. Optical packet signals 1-1, 1-2, and 2-1 that have been input are all directed to the first output unit 164 as an output destination.

Figure 5:
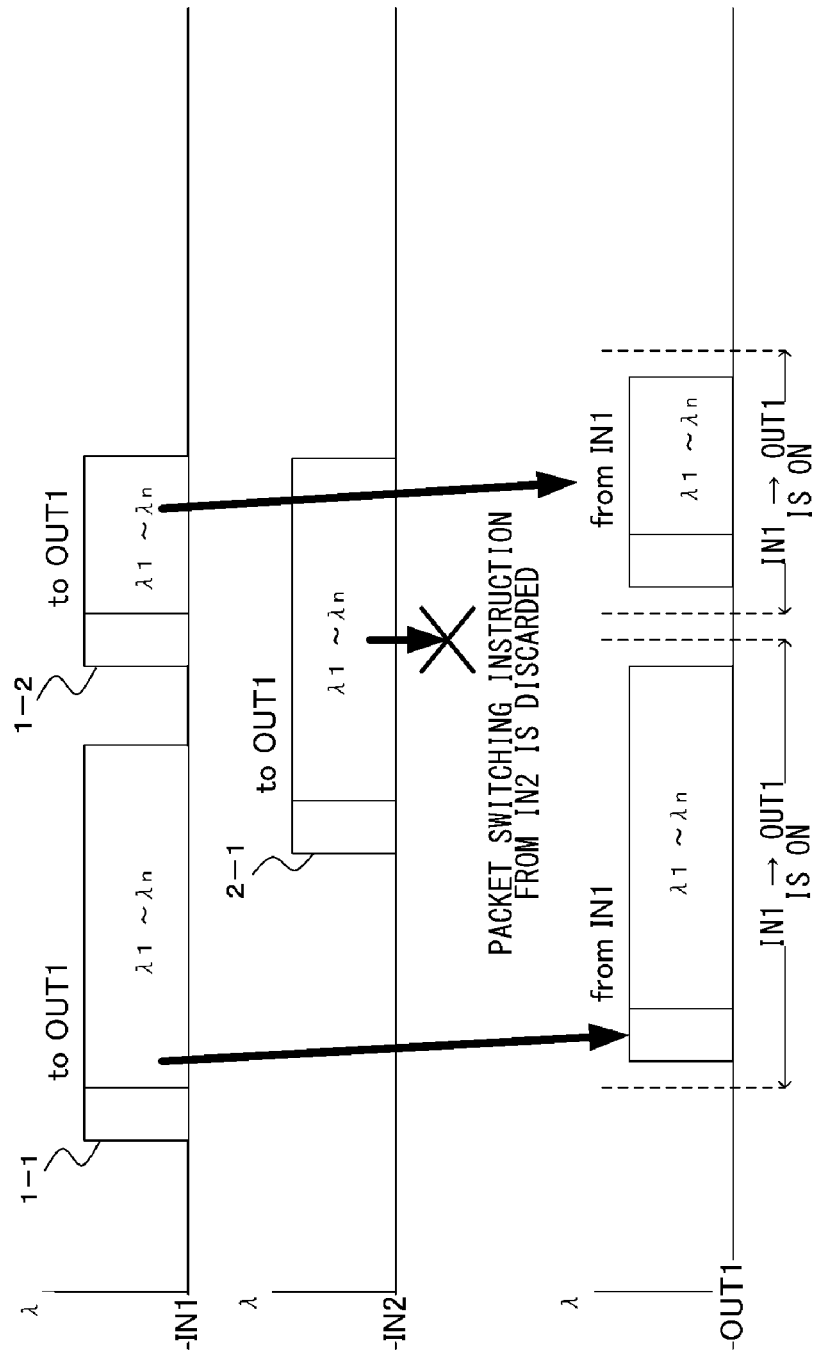
FIGS. 5A-5C illustrate output competition determination in the optical packet switching device.

As shown in FIG. 5, the optical packet signal 1-1 is first input to the first input unit 162, the optical packet signal 2-1 is then input to the second input unit 163, and the optical packet signal 1-2 is lastly input to the first input unit 162. Since the optical packet signal 1-1 is a signal that arrives first, the output competition determination unit 179 outputs the optical packet signal 1-1 to the first output unit 164. In other words, the output competition determination unit 179 turns on the optical gate switch 180 of the optical switch unit 160 and opens a path from the first input unit 162 to the first output unit 164.

However, the optical packet signal 2-1 input to the second input unit 163 temporally competes with the optical packet signal 1-1 input to the first input unit 162. In other words, the two optical packet signals concur in time. In this case, the output competition determination unit 179 discards the optical packet signal 2-1. In other words, the output competition determination unit 179 leaves off the optical gate switches 182 and 183 to which the optical packet signal 2-1 is input.

Although the optical packet signal 1-2 input to the first input unit 162 has an overlapping data portion with the optical packet signal 2-1, the output competition determination unit 179 outputs the optical packet signal 1-2 to the first output unit 164 since the optical packet signal 2-1 is already discarded.

As described, if congestion occurs in some optical packet signals when optical packet signals are received almost at the same timing from a plurality of input units with output requests for a same output route in the optical packet switching device according to the comparative example, a process is performed where an optical packet signal received first is allowed to pass and where the following optical packet signal is discarded.

Meanwhile, the degree of priority for transmission may be set for a client signal such as, e.g., an Ether signal according to the type (emails, phones, video images, etc.) of data. In such a situation, an optical packet signal with a high degree of priority is preferably transmitted at speed higher than an optical packet signal with a low degree of priority. A description will be given in the following of an optical packet switching system capable of transmitting a client signal at a higher speed as the degree of priority thereof increases.

Figure 6:
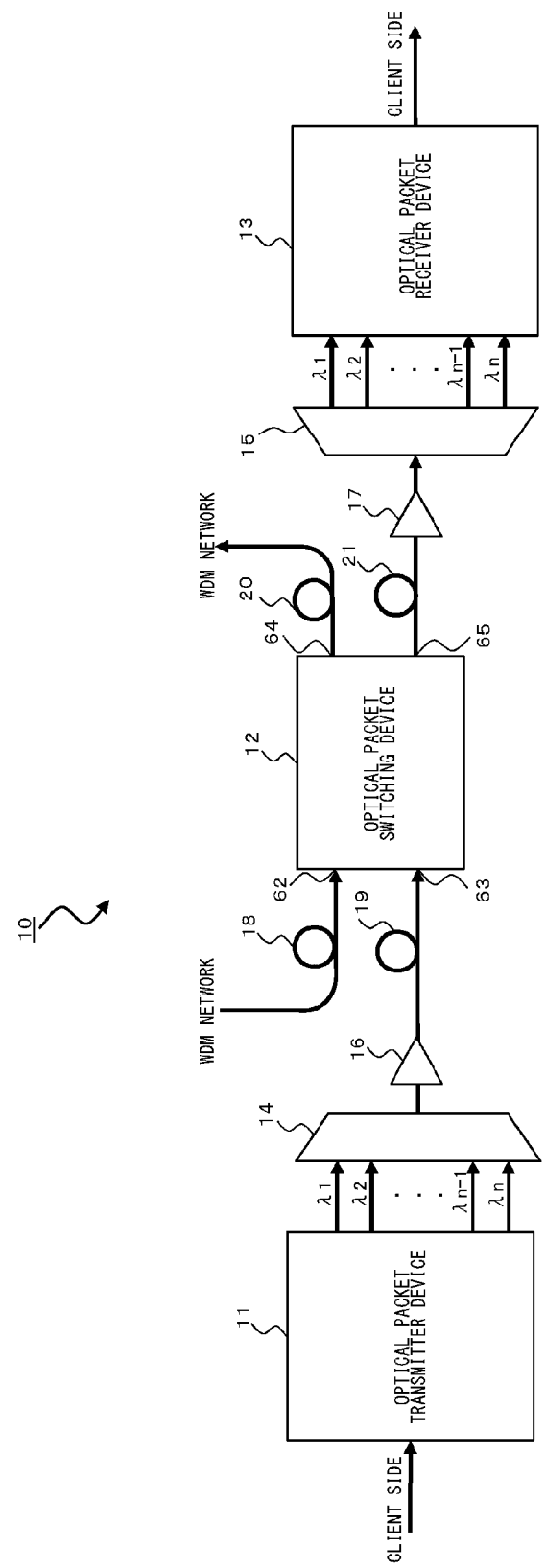
FIG. 6 shows an optical packet switching system according to the embodiment of the present invention.

FIG. 6 shows an optical packet switching system 10 according to the embodiment of the present invention. As shown in FIG. 6, the optical packet switching system 10 comprises an optical packet transmitter device 11, an optical packet switching device 12, an optical packet receiver device 13, a first AWG 14, a second AWG 15, a first optical amplifier 16, a second optical amplifier 17, and first through fourth optical transmission paths 18-21. The basic configuration of the optical packet switching system 10 is similar to that of the optical packet switching system 110 shown in FIG. 1. Thus, a detailed description is omitted.

Figure 7:
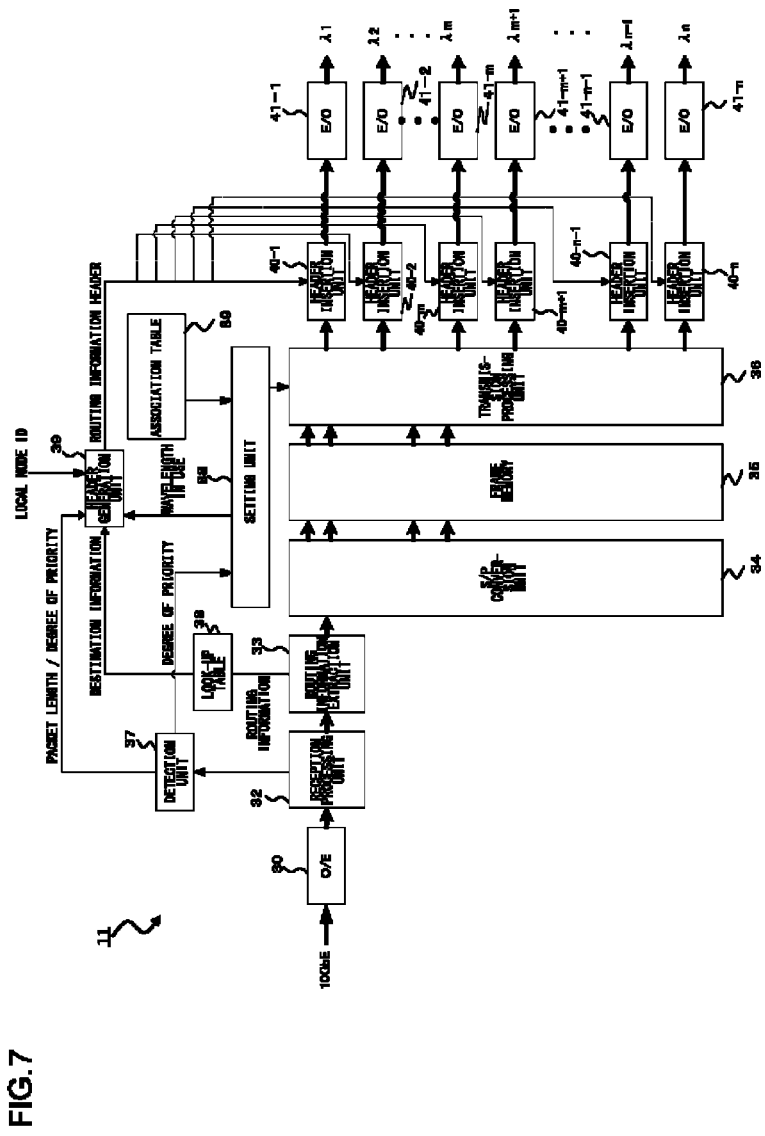
FIG. 7 shows the configuration of an optical packet transmitter device according to the present embodiment.

FIG. 7 shows the configuration of the optical packet transmitter device 11 according to the embodiment. As shown in FIG. 7, the optical packet transmitter device 11 comprises an optical/electrical converter unit 30, a reception processing unit 32, a routing information extraction unit 33, a serial/parallel conversion unit 34, a frame memory 35, a transmission processing unit 36, a detection unit 37, a look-up table 38, a header generation unit 39, a setting unit 88, an association table 89, first through nth header insertion unit 40-1 through 40-$n$, and first through nth electrical/optical converter units 41-1 through 41-$n$. The optical packet transmitter device 11 functions as an Ether signal/optical packet converter device.

A 10 Gigabit Ethernet signal is input to the optical packet transmitter device 11 from the client. Priority information determined by the client managing data according to the type of the data is included in the Ether signal. The priority information represents the degree of importance of the Ether signal, and an Ether signal with a high degree of propriety is transmitted preferentially over a signal with a low degree of priority. An example of data with a high degree of priority includes, for example, data for Video On Demand that continuously transmits large volumes of video data.

The 10 Gigabit Ethernet signal input from the client is converted into an electrical signal by the optical/electrical converter unit 30. The data format of this electrical Ether signal is a MAC frame. A predetermined reception process is then performed on the Ether signal in the reception processing unit 32. The Ether signal on which the reception process has been performed by the reception processing unit 32 is output to the routing information extraction unit 33 and the detection unit 37.

The routing information extraction unit 33 extracts routing information from the Ether signal that has been input. The routing information is converted into destination information by referring to the look-up table 38 and then input to the header generation unit 39.

The detection unit 37 detects packet-length information and priority information in the received Ether signal. The detected packet-length information and priority information are output to the header generation unit 39. The priority information is also output to the setting unit 88.

According to the detected degree of priority, the setting unit 88 sets a division factor by which the received Ether signal is to be divided and a wavelength used for an optical packet signal to be transmitted. More specifically, when the degree of priority is less than a predetermined reference level, the setting unit 88 sets the division factor and the corresponding number of wavelengths in use to a first predetermined value m and sets the wavelengths in use to a predetermined first wavelength group (wavelengths $\lambda 1$ through $\lambda m$). When the degree of priority is at least the reference level, the setting unit 88 sets the division factor and the corresponding number of wavelengths in use to a second predetermined value $n-m$ and sets the wavelengths in use to a predetermined second wavelength group (wavelengths $\lambda m+1$ through $\lambda n$). The notation n represents the maximum number of wavelengths that can be used, and the notation m represents an integer of at least 2 that satisfies $m < n-m$. The first wavelength group and the second wavelength group are set such that the groups have different wavelength allocation, in other words, such that no wavelength is overlapped.

Figure 8:
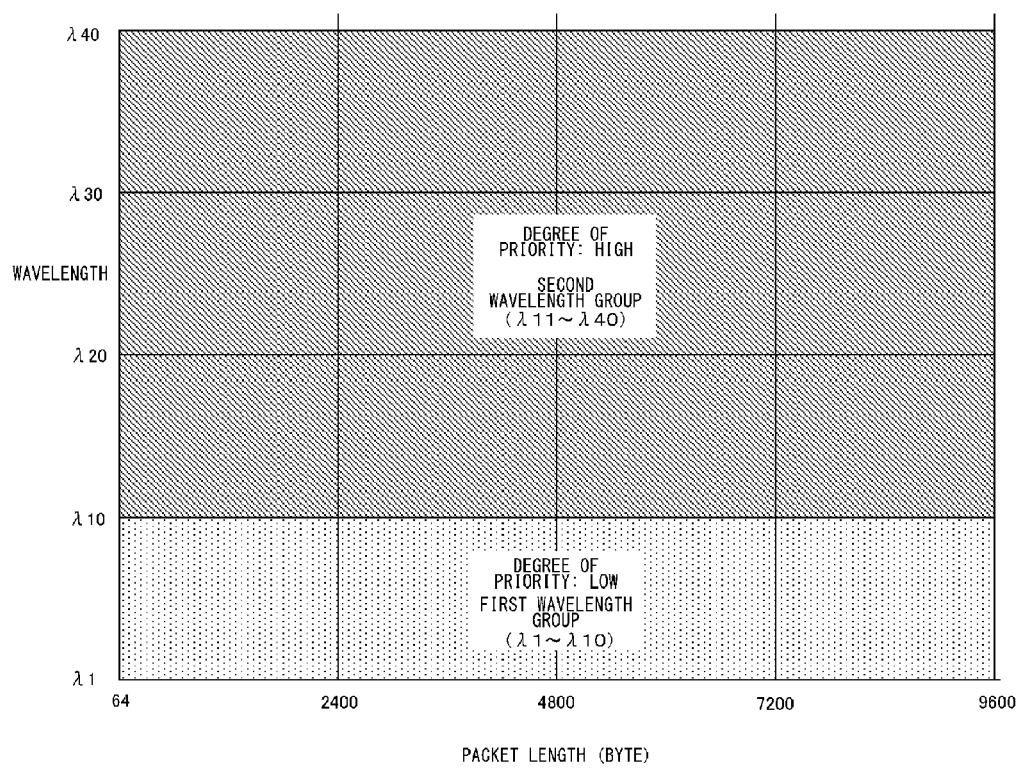
FIG. 8 shows an example of wavelength allocation.

FIG. 8 shows an example of wavelength allocation. In FIG. 8, the maximum wavelength number n is set to be 40, the first predetermined value m is set to be 10, and the second predetermined value n−m is set to be 30. As shown in FIG. 8, when the degree of priority of an optical packet signal is less than a given reference level (hereinafter, referred to as a "low" degree of priority), the setting unit 88 sets the division factor and the number of wavelengths in use to be 10 and sets the wavelengths in use to the first wavelength group (wavelengths λ1 through λ10). When the degree of priority of an optical packet signal is at least the reference level (hereinafter, referred to as a "high" degree of priority), the setting unit 88 sets the division factor and the number of wavelengths in use to be 30 and sets the wavelengths in use to the second wavelength group (wavelengths λ11 through λ40). In a 10 Gigabit Ethernet signal, etc., a packet of up to 1518 bytes is referred to as a "normal packet," and a packet that is larger than this is referred to as a "jumbo packet." However, in this example, the division factor and the number of wavelengths in use are set based on the degree of priority regardless of the packet length.

Referring back to FIG. 7, a table associating the degree of priority and a wavelength group with each other as described above is described in the association table 89. When the degree of priority is input from the detection unit 37, the setting unit 88 sets a wavelength group to be used, in reference to the association table 89.

The header generation unit 39 collects packet-length information, priority information, destination information, local-node ID information, and information of wavelength in use so as to generate a routing information header.

The Ether signal output from the routing information extraction unit 33 is converted into a parallel signal by the serial/parallel conversion unit 134 and then stored in the frame memory 35. The transmission processing unit 36 then divides an Ether signal according to the division factor set by the setting unit 88 and generates a plurality of packet signals. In other words, the Ether signal is equally divided by m when the degree of priority of the Ether signal is "low," and the Ether signal is equally divided by n−m when the degree of priority of the Ether signal is "high."

When the degree of priority of the Ether signal is "low," packet signals divided into m pieces are input to first through mth header insertion unit 40-1 through 40-m, respectively. The first header insertion unit 40-1 inserts, in the input packet signal, a routing information header generated by the header generation unit 39. The second through mth header insertion unit 40-2 through 40-m insert, in the input packet signals, a dummy header. First through mth electrical/optical converter unit 41-1 through 41-m respectively convert the packets signals from the first through mth header insertion unit 40-1 through 40-m into optical signals and transmit optical packet signals at wavelengths λ1 through λm. The header wavelength is λ1 in this case.

Meanwhile, when the degree of priority of the Ether signal is "high," packet signals divided into n−m pieces are input to (m+1)th through nth header insertion unit 40-m+1 through 40-n, respectively. The (m+1)th header insertion unit 40-m+1 inserts, in the input packet signal, a routing information header generated by the header generation unit 39. The (m+2)th through nth header insertion unit 40-m+2 through 40-n insert a dummy header in the input packet signals. (m+1)th through nth electrical/optical converter unit 41-m+1 through 41-n respectively convert the packets signals from the (m+1)th through nth header insertion unit 40-m+1 through 40-n into optical signals and transmit optical packet signals at wavelengths λm+1 through λn. The header wavelength is λm+1 in this case.

In the present embodiment, header wavelengths are set to be the wavelengths of λ1 and λm+1. However, a header wavelength can be appropriately modified. In FIG. 7, dashed arrows are drawn that are directed from the header generation unit 39 to header insertion units other than the first header insertion unit 40-1 and the (m+1) the header insertion unit 40-m+1, in order to indicate that the header wavelength can be modified.

Figure 9:
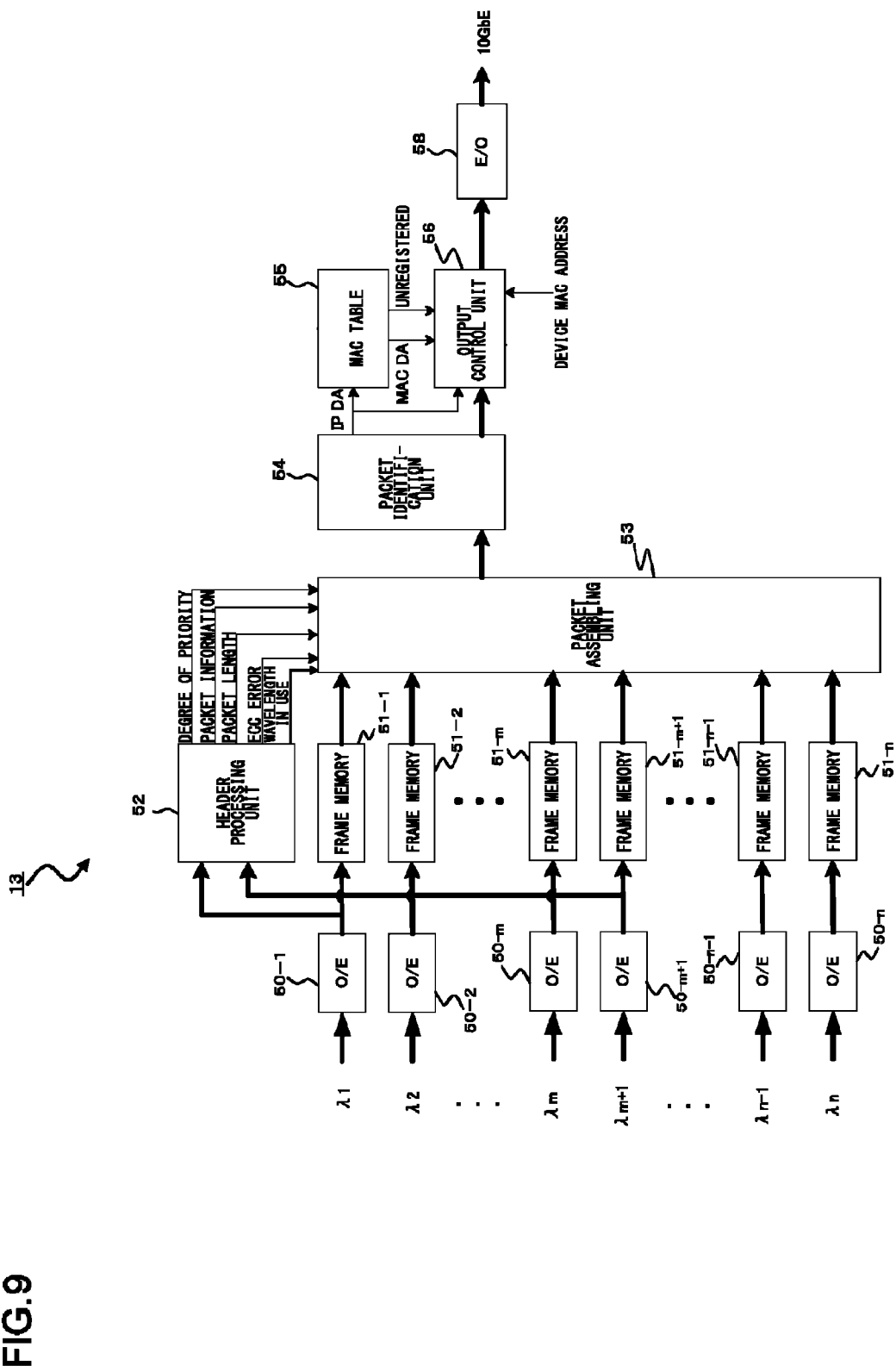
FIG. 9 shows the configuration of an optical packet receiver device according to the present embodiment.

FIG. 9 shows the configuration of the optical packet receiver device 13 according to the embodiment. As shown in FIG. 9, the optical packet receiver device 13 comprises a first through nth optical/electrical converter units 50-1 through 50-n, first through nth frame memories 51-1 through 51-n, a header processing unit 52, a packet assembling unit 53, a packet identification unit 54, a MAC table 55, an output control unit 56, and an electrical/optical converter unit 58. The optical packet receiver device 13 functions as an optical packet/Ether signal converter device.

In the optical packet receiver device 13, optical packet signals at wavelengths λ1 through λm whose original Ether signal has a "low" degree of priority are input to first through mth optical/electrical converter units 50-1 through 50-m and converted into electrical packet signals. Meanwhile, optical packet signals at wavelengths λm+1 through λn whose original Ether signal has a "high" degree of priority are input to (m+1)th through nth optical/electrical converter units 50-m+1 through 50-n and converted into electrical packet signals.

The header processing unit 152 extracts priority information, information of wavelength in use, packet information, packet-length information, and ECC (Error Check Code) error information from the routing information header of a packet signal converted from an optical packet signal of a header wavelength of λ1 or λm+1 and transmits these to the packet assembling unit 53.

The packet signals output from the first through nth optical/electrical converter units 150-1 through 150-n are stored in the first through nth frame memories 51-1 through 51-n, respectively. The packet assembling unit 53 assembles a packet in reference to the priority information, the information of wavelength in use, the packet information, the packet-length information, and the ECC error information from the header processing unit 52.

The packet identification unit 54 identifies an Ether packet from the output of the packet assembling unit 53 and extracts the Ether packet. The packet identification unit 54 performs packet anomaly detection by reading a FCS (Frame Check Sequence), which is a CRC (Cyclic Redundancy Check) calculated from the respective fields of a destination address, transmission source address, length/type, and data of the Ether signal and by making comparison with a CRC value calculated in a local station and discards the data in the case of anomaly.

In reference to the MAC table 55, the output control unit 56 replaces a destination MAC address in the Ether packet output from the packet identification unit 54 with a MAC address registered in the MAC table 55. The Ether packet is then input to the electrical/optical converter unit 58. The data format of the Ether signal input to the electrical/optical converter unit 58 is a MAC frame. The electrical/optical converter unit 58 converts the Ether packet into an optical signal and then output the optical signal to the client.

Figure 10:
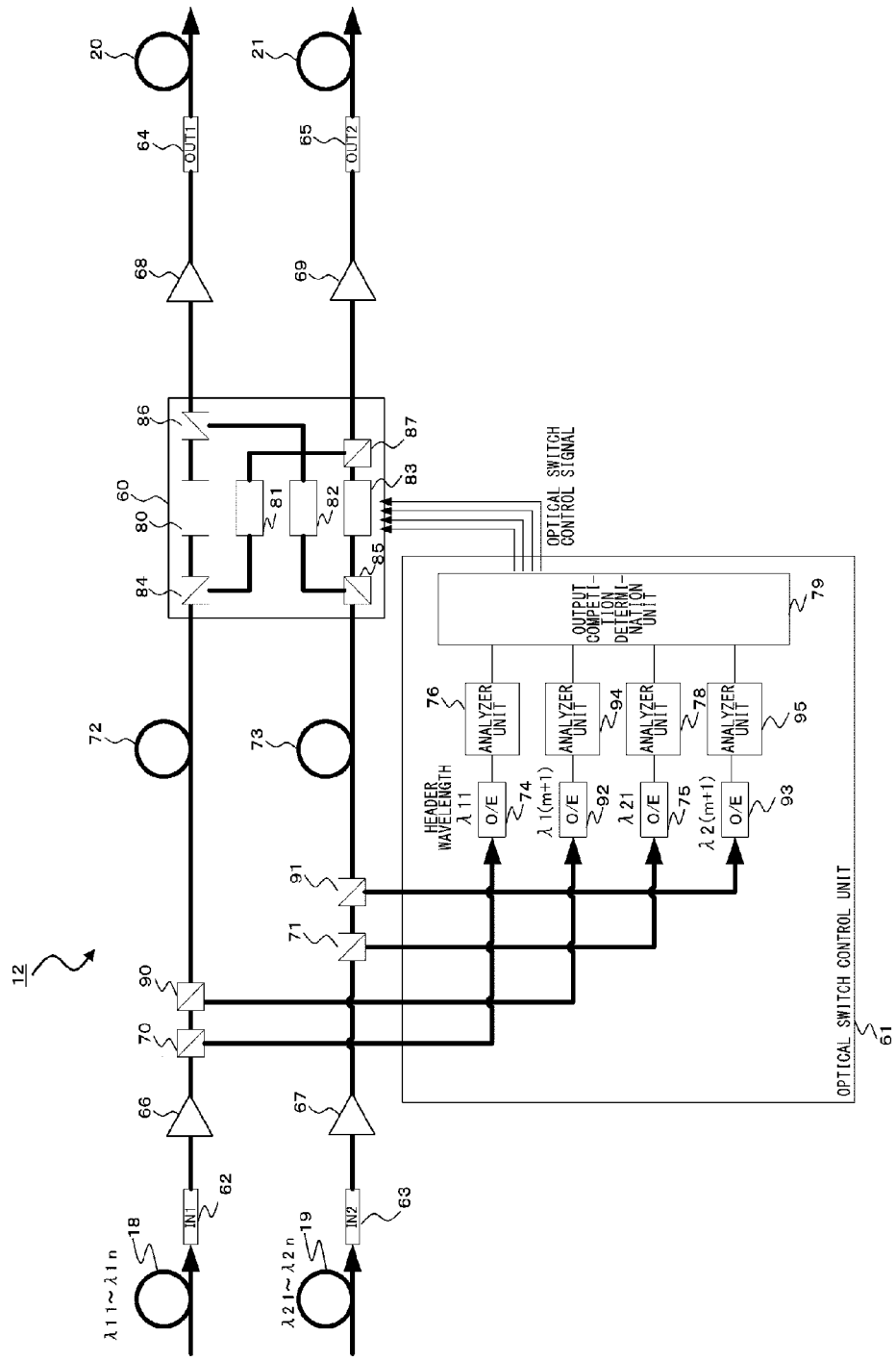
FIG. 10 shows the configuration of an optical packet switching device according to the present embodiment.

FIG. 10 shows the configuration of the optical packet switching device 12 according to the embodiment. As shown in FIG. 10, the optical packet switching device 12 comprises an optical switch unit 60, an optical switch control unit 61, a first input unit 62, a second input unit 63, a first input-side optical amplifier 66, a second input-side optical amplifier 67, a first demultiplexer 70, a second demultiplexer 71, a third demultiplexer 90, a fourth demultiplexer 91, a first optical delay line 72, a second optical delay line 73, a first output-side optical amplifier 68, a second output-side optical amplifier 69, a first output unit 64, and a second output unit 65. The optical switch control unit 61 comprises a first optical/electrical converter unit 74, a second optical/electrical converter unit 75, a third optical/electrical converter unit 92, a fourth optical/electrical converter unit 93, a first analyzer unit 76, a second analyzer unit 78, a third analyzer unit 94, a fourth analyzer unit 95, and an output competition determination unit 79.

The optical packet switching device 12 extracts the routing information header from an optical packet signal that has been input as a WDM signal from the client or the network. The optical packet switching device 12 then determines an output destination based on the routing information header and switches the output destination by the optical switch unit 60.

Wavelength-multiplexed optical packet signals output from the optical packet transmitter device are input to the first input unit 62 and the second input unit 63. The wavelengths of the optical packet signals input to the first input unit 62 are set to be $\lambda 1\_1$ through $\lambda 1\_n$ ($\lambda 1\_1$ through $\lambda 1\_m$ (the first wavelength group) in the case when the original Ether signal has a "low" degree of priority and $\lambda 1\_m+1$ through $\lambda 1\_n$ (the second wavelength group) in the case when the original Ether signal has a "high" degree of priority). The wavelengths of the optical packet signals input to the second input unit 63 are set to be $\lambda 2\_1$ through $\lambda 2\_n$ ($\lambda 2\_1$ through $\lambda 2\_m$ (the first wavelength group) in the case when the original Ether signal has a "low" degree of priority and $\lambda 2\_m+1$ through $\lambda 2\_n$ (the second wavelength group) in the case when the original Ether signal has a "high" degree of priority). The optical packet signals that are input are obtained by converting an Ether signal from a client unit of the local node or a client unit of another node in an optical packet transmitter device such as the one shown in FIG. 7.

When optical packet signals of the first wavelength group are input to the first input-side optical amplifier 66 and the second input-side optical amplifier 67, the optical packet signals are amplified by the first input-side optical amplifier 66 and second input-side optical amplifier 67 for optical level adjustment. Then, only optical packet signals of header wavelengths of $\lambda 1\_1$ and $\lambda 2\_1$ are optically branched by the first demultiplexer 70 and the second demultiplexer 71. The branched optical packet signals of the wavelengths of $\lambda 1\_1$ and $\lambda 2\_1$ are input to the optical switch control unit 61. Then, the optical packet signals of the wavelengths of $\lambda 1\_1$ and $\lambda 2\_1$ are converted into electrical signals by the first optical/electrical converter unit 74 and the second optical/electrical converter unit 75, respectively. Then, routing information headers thereof are analyzed by the first analyzer unit 76 and the second analyzer unit 78 so as to detect destination information, packet-length information, information of wavelength in use, and priority information. Meanwhile, wavelength-multiplexed optical packet signals passed through the first demultiplexer 70 and the second demultiplexer 71 are input to the optical switch unit 60 via the first optical delay line 72 and the second optical delay line 73.

When optical packet signals of the second wavelength group are input to the first input-side optical amplifier 66 and the second input-side optical amplifier 67, the optical packet signals are amplified by the first input-side optical amplifier 66 and second input-side optical amplifier 67. Then, only optical packet signals of header wavelengths of $\lambda 1\_m+1$ and $\lambda 2\_m+1$ are optically branched by the third demultiplexer 90 and the fourth demultiplexer 91. The branched optical packet signals of the wavelengths of $\lambda 1\_m+1$ and $\lambda 2\_m+1$ are input to the optical switch control unit 61. Then, the optical packet signals of the header wavelengths of $\lambda 1\_m+1$ and $\lambda 2\_m+1$ are converted into electrical signals by the third optical/electrical converter unit 92 and the fourth optical/electrical converter unit 93, respectively. Then, routing information headers thereof are analyzed by the third analyzer unit 94 and the fourth analyzer unit 95 so as to detect destination information, packet-length information, information of wavelength in use, and priority information. Meanwhile, wavelength-multiplexed optical packet signals passed through the third demultiplexer 90 and the fourth demultiplexer 91 are input to the optical switch unit 60 via the first optical delay line 72 and the second optical delay line 73.

Based on the destination information detected by the analyzer units, the output competition determination unit 79 determines whether or not there is temporal competition, i.e., concurrence in time, of the wavelength-multiplexed optical packet signals input to the first input unit 62 and the second input unit 63. Based on the information of wavelength in use detected by the analyzer units, the output competition determination unit 79 determines whether or not there is competition regarding wavelengths, i.e., overlap of wavelengths in use, of the wavelength-multiplexed optical packet signals input to the first input unit 62 and the second input unit 63. When there is competition regarding time and wavelengths, the output competition determination unit 79 determines whether the optical packet signals should be transmitted or discarded based on the priority information. More specifically, when the wavelength-multiplexed optical packet signals input to the first input unit 62 and the second input unit 63 have equal degree of priority, it is determined to allow a wavelength-multiplexed optical packet signal input first to pass and to discard the following wavelength-multiplexed optical packet signal. Meanwhile, when the wavelength-multiplexed optical packet signals input to the first input unit 62 and the second input unit 63 have different degree of priority, it is determined to allow an optical packet with a high degree of priority to pass and to discard an optical packet with a low degree of priority.

The first optical delay line 72 and the second optical delay line 73 delay the wavelength-multiplexed optical packet signals for a duration required for the optical switch control unit 61 to generate the optical switch control signal. By providing the first optical delay line 72 and the second optical delay line 73, on/off of the optical switch unit 60 can be controlled to be synchronized with the timing of arrival of the optical packet signals at the optical switch unit 60.

The optical switch unit 60 is a 2×2 optical switch and comprises first through fourth optical gate switches 80 through 83 and four optical couplers 84-87. The optical gate switches may be implemented by a semiconductor optical amplifier (SOA). The first through fourth optical gate switches 80 through 83 are controlled to be turned on or off by an optical switch control signal from the optical switch control unit 61.

Figure 11A:
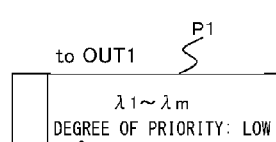
FIGS. 11A-11C illustrate output competition determination in the optical packet switching device.
Figure 11B:
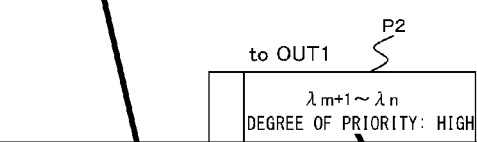
Figure 11C:
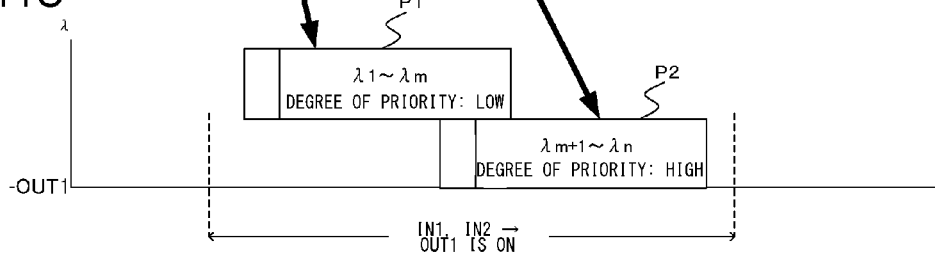

FIGS. 11A-11C illustrate output competition determination in the optical packet switching device 12. FIG. 11A shows a first optical packet signal P1 input to the first input unit 62. FIG. 11B shows a second optical packet signal P2 input to the second input unit 63. FIG. 11C shows an optical packet signal output from the first output unit 64.

As shown in FIGS. 11A and 11B, the first optical packet signal P1 is first input to the first input unit 62, and the second optical packet signal P2 is then input to the second input unit 63. The optical packet signals P1 and P2 are all directed to the first output unit 64 as an output destination. It is assumed that the first optical packet signal P1 is a wavelength-multiplexed optical packet signal with a "low" degree of priority and of the first wavelength group (λ1 through λm), and the second optical packet signal P2 is a wavelength-multiplexed optical packet signal with a "high" degree of priority and of the second wavelength group (λm+1 through λn).

Since the first optical packet signal P1 is an optical packet signal that arrives first, the first optical packet signal P1 is output to the first output unit 64. The second optical packet signal P2 is a subsequent optical packet signal, and a part of data thereof temporally compete with that of the first optical packet signal P1 (i.e., there is concurrence in time). Thus, whether or not the second optical packet signal P2 is to be transmitted is an issue.

The output competition determination unit 79 determines whether or not there is competition regarding wavelengths in the first optical packet signal P1 and the second optical packet signal P2. In the example shown in FIGS. 11A-11C, the output competition determination unit 79 can determine that there is no wavelength competition in the first optical packet signal P1 and the second optical packet signal P2 based on the information of wavelength in use. In this case, since the first optical packet signal P1 and the second optical packet signal P2 are able to coexist, the output competition determination unit 79 outputs the second optical packet signal P2 to the first output unit 64 regardless of the degree of priority, as shown in FIG. 11.

Two output routes, network output and client output, can be possible as basic output routes in an optical packet switching device. As shown in FIGS. 11A-11C, when signals are output to a network, the signals are transmitted to a same output route even when the signals have been input at the same timing, if there is no wavelength competition. However, when signals are output to a client, different optical packet signals can be input to an optical packet/Ether signal converter device at the same timing. An example includes a case where a wavelength group of one optical packet signal is in λ1 through λm and where a wavelength group of another optical packet signal is in λm+1 through λn. It is thus necessary to avoid competition at the time of Ether signal conversion in the optical packet/Ether signal converter device.

There are two possible methods for avoiding competition. One method is for allowing the one that has been input first to pass, and the other method is for allowing the one with a higher degree of priority to pass. If there is enough space in frame memory units for respective optical packet signals in an optical packet/Ether signal converter device, a method is also possible where two input optical packet signals are stored in respective frame memory units so as to convert the signals into Ether signal in the order of the input timing.

Figure 12:
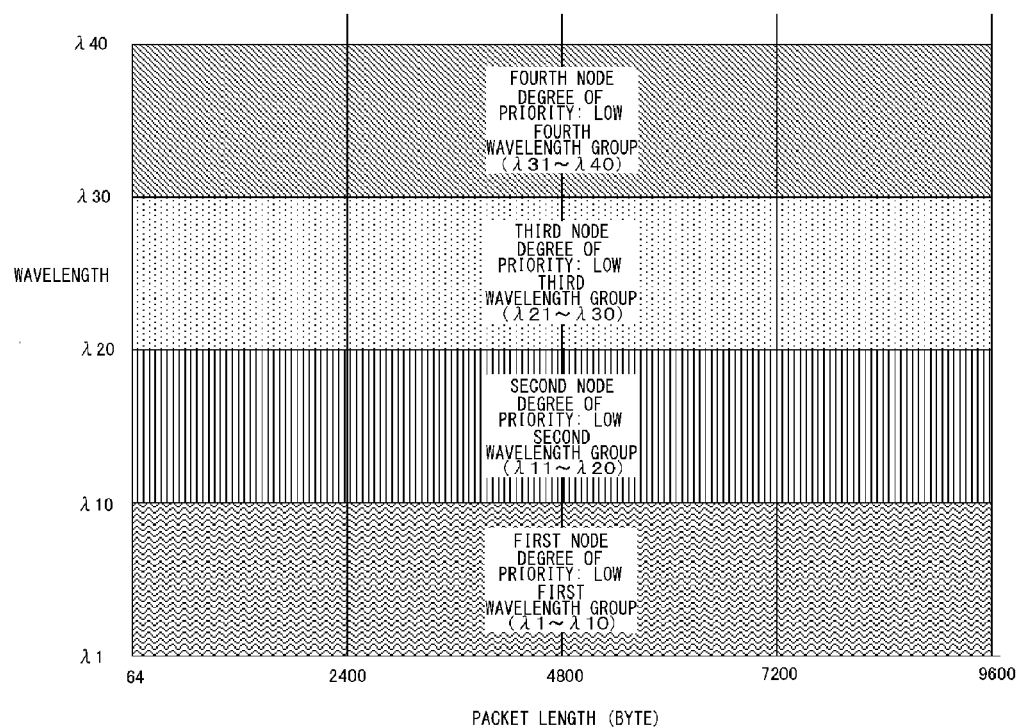
FIG. 12 shows another example of wavelength allocation.

FIG. 12 shows another example of wavelength allocation. In an actual optical packet switching system, a plurality of optical packet transmitter devices, optical packet switching devices, and optical packet receiver devices are provided as nodes, forming a network. In such an optical packet switching system comprising a plurality of nodes, wavelength allocation of a first wavelength group, which is used when the degree of priority is "low," may be changed on a node-by-node basis.

FIG. 12 shows that, when a node number and the maximum number of wavelengths are set to be 4 and 40, respectively, a first wavelength group (λ1 through λ10) is used for transmitting an optical packet signal of a "low" degree of priority at a first node, a second wavelength group (λ11 through λ20) is used for transmitting an optical packet signal of a "low" degree of priority at a second node, a third wavelength group (λ21 through λ30) is used for transmitting an optical packet signal of a "low" degree of priority at a third node, and a fourth wavelength group (λ31 through λ40) is used for transmitting an optical packet signal of a "low" degree of priority at a fourth node.

Changing wavelength allocation on a node-by-node basis that is used when the degree of priority of an Ether signal is "low" as described above allows for reduction of the probability of discarding optical packet signals when a plurality of optical packet signals of a "low" degree of priority temporally compete in an optical packet switching device. In other words, for example, even when an optical packet signal (of the first wavelength group and with a "low" degree of priority) from the first node and an optical packet signal (of the second wavelength group and with a "low" degree of priority) from the second node temporally compete in the optical packet switching device, there is no competition with regard to the wavelength since the wavelength groups being used are different, and the optical packet signals thus can be transmitted to a same output destination without discarding either of the optical packet signals.

FIG. 13 shows an example of a bit configuration for transmitting information of wavelength in use. In this example, information in units of one bit is added to all WDM wavelengths as shown in FIG. 13. If the maximum number of WDM wavelengths is 40, 40 bits are necessary. The bit of a wavelength in use is set to be "1", and the bit of a wavelength not in use is set to be "0". Adding such information of a wavelength in use to a header allows the information of a wavelength in use to be transmitted to an optical packet switching device and an optical packet receiver device.

FIG. 14 shows another example of a bit configuration for transmitting information of a wavelength in use. In this example, the number of wavelength groups are fixed, and the number of bits corresponding to the number of the wavelength groups is prepared. As shown in FIG. 14, if the number of wavelength groups is set to be 8, information of a wavelength in use can be transmitted in 3 bits. A table associating the name of a group with wavelengths that belong to the group is stored in a memory in each device.

FIG. 15 shows an example of a table associating a wavelength group with wavelength composition. Using a table such as the one shown in FIG. 15 allows for reduction of the number of bits for transmitting information of a wavelength in use. If there are 8 wavelength groups, it is possible to transmit information of a wavelength in use by using information of 3 bits.

As described above, in the optical packet switching system 10 according to the present embodiment, the optical packet transmitter device 11 is formed such that a division factor by which an Ether signal is to be divided and a wavelength used for an optical packet signal to be transmitted are set according to the degree of priority of the Ether signal. More specifically, a division factor and the number of wavelengths in use are set to be large for an Ether signal with a high degree of priority, and a division factor and the number of wavelengths in use are set to be small for an Ether signal with a low degree of priority. This allows an optical packet signal to be transmitted at a higher speed as the degree of priority thereof increases.

The optical packet switching device 12 is formed such that, when there is competition regarding both time and wavelengths in wavelength-multiplexed optical packet signals input to a plurality of input units, whether optical packet signals should be transmitted or discarded is determined based on priority information. This allows an Ether signal to be transmitted preferentially as the degree of priority thereof increases, thus allowing for high speed transmission.

In the above-stated embodiment, the degree of priority is defined in two levels: "high" and "low." However, the degree of priority is not limited to these, and a plurality of levels may be set for the degree of priority.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

What is claimed is:

1. An optical packet switching system comprising:
an optical packet transmitter device including
a detection unit configured to detect packet-length information and priority information from a received client signal,
a setting unit configured to set, according to the degree of priority, a division factor by which the client signal is divided and a wavelength used for an optical packet signal to be transmitted,
a header generation unit configured to generate a header containing destination information, the packet-length information, the priority information, and information of wavelength in use of the client signal,
a transmission processing unit configured to divide the client signal according to the set division factor and generate a plurality of packet signals,
a header insertion unit configured to insert the generated header in at least one packet signal, and
an electrical/optical converter unit configured to convert the plurality of packet signals into optical packet signals of a plurality of wavelengths according to the set wavelength in use; and
an optical packet switching device including
a plurality of receiver units configured to receive wavelength-multiplexed optical packet signal in which the optical packet signals of a plurality of wavelengths are multiplexed,
a branching unit configured to branch the received wavelength-multiplexed optical packet signals into optical packet signals of wavelengths with the header,
an optical switch unit configured to route the wavelength-multiplexed optical packet signals,
an analyzer unit configured to analyze the header of the branched optical packet signals so as to detect the destination information, the priority information, and the information of the wavelength in use, and
an output competition determination unit configured to check for temporal competition of the plurality of wavelength-multiplexed optical packet signals input to the plurality of receiver units based on destination information, to check for competition regarding wavelengths of the plurality of wavelength-multiplexed optical packet signals input to the plurality of receiver units based on the information of wavelength in use, and to determine whether the optical packet signals should be transmitted or discarded based on the priority information when there is competition regarding time and wavelengths.

2. The optical packet switching system according to claim 1, wherein the setting unit sets the division factor by which the client signal is divided and the corresponding number of wavelengths in use to be a first predetermined value and sets the wavelengths in use to be a predetermined first wavelength group when the degree of priority is less than a reference level, and wherein the setting unit sets the division factor and the number of wavelengths in use to be a second predetermined value, which is larger than the first predetermined value, and sets the wavelengths in use to a predetermined second wavelength group when the degree of priority is at least the predetermined reference level.

3. The optical packet switching system according to claim 2, wherein the first wavelength group and the second wavelength group have different wavelength allocation.

4. The optical packet switching system according to claim 2 comprising:
a plurality of the optical packet transmitter devices as nodes, wherein
the wavelength allocation of the first wavelength group is different on a node-by-node basis.

5. The optical packet switching system according to claim 1, wherein the output competition determination unit compares the degree of priority of competing wavelength-multiplexed optical packet signals when there is competition regarding time and wavelengths in the plurality of wavelength-multiplexed optical packet signals, and wherein the output competition determination unit allows a wavelength-multiplexed optical packet signal input first to pass and discards the following wavelength-multiplexed optical packet signal when the wavelength-multiplexed optical packet signals have equal degree of priority.

6. The optical packet switching system according to claim 1, wherein the output competition determination unit compares the degree of priority of competing optical packet signals when there is competition regarding time and wavelengths in the plurality of wavelength-multiplexed optical packet signals, and wherein the output competition determination unit allows an optical packet signal having a high degree of priority to pass and discards an optical packet having a low degree of priority when the optical packet signals have different degree of priority.

7. The optical packet switching system according to claim 1, wherein the optical packet transmitter device further comprises a table associating the degree of priority and a wavelength group.

8. An optical packet transmitter device for use in an optical packet switching system comprising:
a detection unit configured to detect packet-length information and priority information from a received client signal;
a setting unit configured to set, according to the degree of priority, a division factor by which the client signal is divided and a wavelength used for an optical packet signal to be transmitted;
a header generation unit configured to generate a header containing destination information, the packet-length information, the priority information, and information of wavelength in use of the client signal;
a transmission processing unit configured to divide the client signal according to the set division factor and generate a plurality of packet signals;
a header insertion unit configured to insert the generated header in at least one packet signal; and
an electrical/optical converter unit configured to convert the plurality of packet signals into optical packet signals of a plurality of wavelengths according to the set wavelength in use.

9. The optical packet transmitter device according to claim 8, wherein the setting unit sets the division factor by which the client signal is divided and the corresponding number of wavelengths in use to be a first predetermined value and sets the wavelengths in use to be a predetermined first wavelength group when the degree of priority is less than a reference level, and wherein the setting unit sets the division factor and the number of wavelengths in use to be a second predetermined value, which is larger than the first predetermined value, and sets the wavelengths in use to a predetermined second wavelength group when the degree of priority is at least the predetermined reference level.

10. The optical packet transmitter device according to claim 9, wherein the first wavelength group and the second wavelength group have different wavelength allocation.

11. The optical packet transmitter device according to claim 8 further comprising a table associating the degree of priority and a wavelength group.

* * * * *